US011133135B2

(12) United States Patent
Hsu (10) Patent No.: US 11,133,135 B2
(45) Date of Patent: Sep. 28, 2021

(54) INPUT DEVICE (71) Applicants: LITE-ON ELECTRONICS (GUANGZHOU) LIMITED, Guangzhou (CN); Lite-On Technology Corporation, Taipei (TW)

(72) Inventor: Kuo-Hui Hsu, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/794,254

(22) Filed: Feb. 19, 2020

(65) Prior Publication Data
US 2020/0272206 A1 Aug. 27, 2020

Related U.S. Application Data (60) Provisional application No. 62/808,818, filed on Feb. 21, 2019.

(30) Foreign Application Priority Data

Dec. 27, 2019 (CN) .......................... 201911372934.7

(51) Int. Cl.
*G06F 1/00* (2006.01)
*H01H 13/14* (2006.01)
(Continued)

(52) U.S. Cl.
CPC ............... *H01H 13/14* (2013.01); *G05G 1/10* (2013.01); *G06F 1/169* (2013.01); *G06F 1/1664* (2013.01);
(Continued)

(58) Field of Classification Search
CPC ...... H01H 13/14; H01H 3/125; H01H 13/705; H01H 13/83; H01H 2217/01;
(Continued)

(56) References Cited

U.S. PATENT DOCUMENTS 4,527,030 A * 7/1985 Oelsch .................. H01H 1/403
200/5 A
5,201,824 A * 4/1993 Kato .................... H01H 13/705
200/341
(Continued)

FOREIGN PATENT DOCUMENTS

CN 105023788 11/2015
CN 107946114 4/2018
(Continued)

OTHER PUBLICATIONS

"Office Action of China Counterpart Application", dated Jul. 21, 2021, p. 1-p. 8.

*Primary Examiner* — Pete T Lee
(74) *Attorney, Agent, or Firm* — JCIPRNET (57) ABSTRACT

The invention provides an input device, including: a substrate, including at least one connecting portion and at least one limiting portion; at least one key, including at least one first engagement portion and at least one second engagement portion located on two opposite sides, where the first engagement portion is in contact with the connecting portion, so that the key can rotate relative to the substrate by taking the connecting portion as a rotation center, and the second engagement portion faces the limiting portion and is spaced apart from the limiting portion; and a buffer unit, disposed on at least one of two surfaces of the limiting portion and the second engagement portion facing each other. By disposing the buffer unit, noise generated due to
(Continued)

the collision between the second engagement portion and the limiting portion can be decreased.

21 Claims, 7 Drawing Sheets

(51) Int. Cl.
| | | |
|---|---|---|
| *G06F 1/16* | (2006.01) | |
| *H01H 3/12* | (2006.01) | |
| *H01H 13/705* | (2006.01) | |
| *H01H 13/83* | (2006.01) | |
| *G06F 3/041* | (2006.01) | |
| *G05G 1/10* | (2006.01) | |
| *G06F 3/0354* | (2013.01) | |
| *G06F 3/0362* | (2013.01) | |

(52) U.S. Cl.
CPC ........ *G06F 3/0362* (2013.01); *G06F 3/03543* (2013.01); *G06F 3/041* (2013.01); *H01H 3/125* (2013.01); *H01H 13/705* (2013.01); *H01H 13/83* (2013.01); *G06F 1/1616* (2013.01); *G06F 2203/04103* (2013.01); *H01H 2217/01* (2013.01); *H01H 2219/03* (2013.01); *H01H 2219/036* (2013.01); *H01H 2221/07* (2013.01)

(58) Field of Classification Search
CPC ......... H01H 2219/03; H01H 2219/036; H01H 2221/07; G05G 1/10; G06F 1/1664; G06F 1/169; G06F 3/03543; G06F 3/0362; G06F 3/041; G06F 1/1616; G06F 2203/04103
See application file for complete search history.

(56) References Cited

U.S. PATENT DOCUMENTS

| | | | | |
|---|---|---|---|---|
| 5,710,397 | A * | 1/1998 | Liao | ..................... H01H 13/705 |
| | | | | 200/345 |
| 5,777,281 | A * | 7/1998 | Riddiford | .............. H01H 13/80 |
| | | | | 200/5 A |
| 6,204,462 | B1 * | 3/2001 | Huang | ..................... H01H 3/12 |
| | | | | 200/345 |
| 9,779,894 | B2 * | 10/2017 | Cohen | .................... H01H 13/52 |
| 2020/0211794 | A1 * | 7/2020 | Tseng | .................... H01H 13/04 |

FOREIGN PATENT DOCUMENTS

| CN | 207281658 | 4/2018 |
|---|---|---|
| CN | 108281316 | 7/2018 |
| CN | 109243894 | 1/2019 |

\* cited by examiner

INPUT DEVICE

CROSS-REFERENCE TO RELATED APPLICATION

This application claims the priority benefits of U.S. provisional application Ser. No. 62/808,818, filed on Feb. 21, 2019, and China application serial no. 201911372934.7, filed on Dec. 27, 2019. The entirety of each of the above-mentioned patent applications is hereby incorporated by reference herein and made a part of this specification.

BACKGROUND

Technical Field

The disclosure relates to an input device, and in particular, to an input device applied to a notebook computer.

Description of Related Art

For a notebook computer, in addition to a keyboard, an input device is additionally disposed around (generally between the keyboard and a user) the keyboard on a host side, to avoid inconvenience in use caused when the user does not bring a mouse. The input device may be a touchpad or a key. The touchpad is configured to control the movement of a pointer, and the key may be pressed to input an instruction.

Generally, after a force applied to the key is removed, noise is generated due to the collision between structures when the key is reset.

SUMMARY

The invention provides an input device capable of decreasing the noise.

The invention provides an input device including a novel architecture.

According to an embodiment of the invention, an input device includes: a substrate, including at least one connecting portion and at least one limiting portion; at least one key, disposed on the substrate and including at least one first engagement portion and at least one second engagement portion located on two opposite sides, where the first engagement portion is pivotally connected to the connecting portion, and the second engagement portion is disposed facing the limiting portion; and a buffer unit, disposed on at least one of two facing surfaces of the limiting portion and the second engagement portion.

In the input device according to the present embodiment of the invention, the buffer unit includes polyurethane (PU), a polymeric foam, epoxy resins, an oil layer, a thermal curing layer, or a photocuring layer.

In the input device according to the present embodiment of the invention, the buffer unit is injection-molded and integrally connected to the limiting portion or the second engagement portion, and the buffer unit is made of a softer material than the limiting portion or the second engagement portion.

According to an embodiment of the invention, an input device that is adapted for being integrated into a keyboard module that includes a plurality of keycaps includes: a substrate, including at least one connecting portion and at least one limiting portion, where the connecting portion and the limiting portion are separately disposed; at least one key, including a body and at least one first engagement portion and at least one second engagement portion located between the body and the substrate, where the body is located on one side of the keycaps, the first engagement portion is movably arranged in the connecting portion, and the second engagement portion is disposed corresponding to the limiting portion, and the first engagement portion is located within a coverage range of the body; and a membrane switch, disposed on the substrate and including a plurality of switches, where at least one of the plurality of switches is correspondingly disposed between the key and the substrate.

According to an embodiment of the invention, an input device includes: a substrate, including at least one connecting portion and at least one limiting portion; and at least one key, including at least one first engagement portion and at least one second engagement portion separated from each other, where the first engagement portion is pivotally connected to the connecting portion, and the second engagement portion faces the corresponding limiting portion, where the input device includes a buffer region, at least a part of the limiting portion and at least a part of the second engagement portion are located in the buffer region, and a hardness of the limiting portion is different from a hardness of the second engagement portion in the buffer region.

In the input device according to the present embodiment of the invention, the connecting portion and the limiting portion are made of a metal, the connecting portion includes an opening, and the first engagement portion is disposed in the opening.

In the input device according to the present embodiment of the invention, the substrate is a metal plate, the connecting portion and the limiting portion are made of plastic and are connected to the metal plate, the connecting portion includes an opening, and the first engagement portion is disposed in the opening.

In the input device according to the present embodiment of the invention, the substrate further includes a first positioning portion located between the connecting portion and the limiting portion, the key further includes a second positioning portion located between the first engagement portion and the second engagement portion, and the first positioning portion and the second positioning portion are paired with each other.

In the input device according to the present embodiment of the invention, the first engagement portion is in contact with the connecting portion, so that the key can rotate relative to the substrate around the connecting portion, and the second engagement portion and the limiting portion are spaced apart.

The input device according to the present embodiment of the invention further includes a restoration member disposed between the substrate and the key. The key further includes a trigger portion, and the trigger portion protrudes from a lower surface of the key and abuts the restoration member. The restoration member may be a rubber dome or a metal dome.

In the input device according to the present embodiment of the invention, one of the limiting portion and the second engagement portion is a hook, and the other of the limiting portion and the second engagement portion is a hole.

In the input device according to the present embodiment of the invention, a surface of the connecting portion facing the first engagement portion is a curved surface or a chamfer.

In the input device according to the present embodiment of the invention, the first engagement portion and the second engagement portion respectively protrude from a lower surface of the key.

Based on the above, because a buffer unit or a buffer region is provided in the input device according to the embodiments of the invention, an effect of decreasing noise can be achieved. In addition, the input device according to the embodiments of the invention includes a novel architecture.

BRIEF DESCRIPTION OF THE DRAWINGS

The accompanying drawings are included to provide a further understanding of the invention, and are incorporated in and constitute a part of this specification. The accompanying drawings illustrate embodiments of the invention and, together with the description, serve to explain the principles of the invention.

DESCRIPTION OF THE EMBODIMENTS

Exemplary embodiments of the invention are described in detail, and examples of the exemplary embodiments are shown in the accompanying drawings. Whenever possible, the same component symbols are used in the drawings and descriptions to indicate the same or similar parts.

Figure 1:
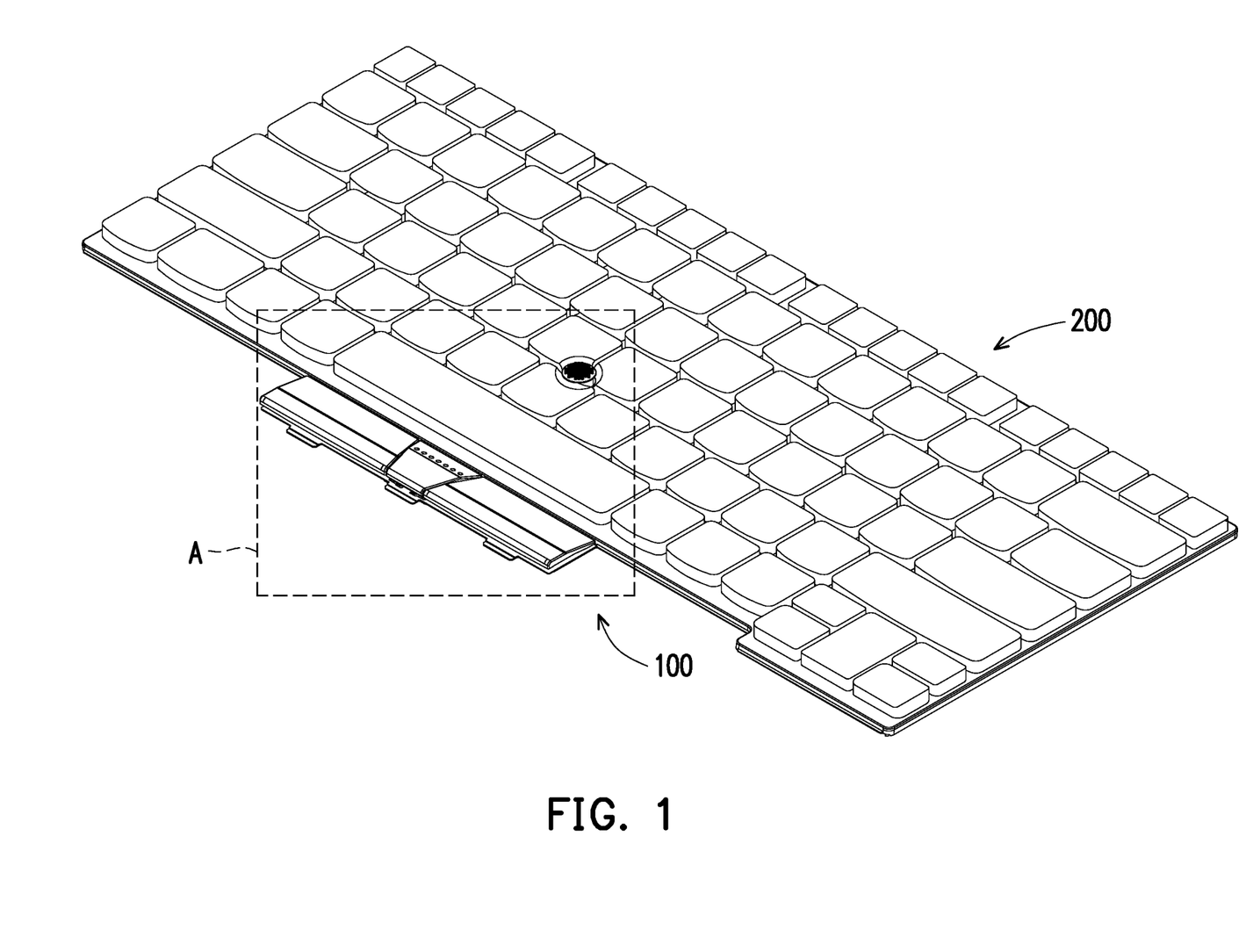
FIG. 1 is a schematic diagram of a keyboard of a notebook computer.
Figure 2A:
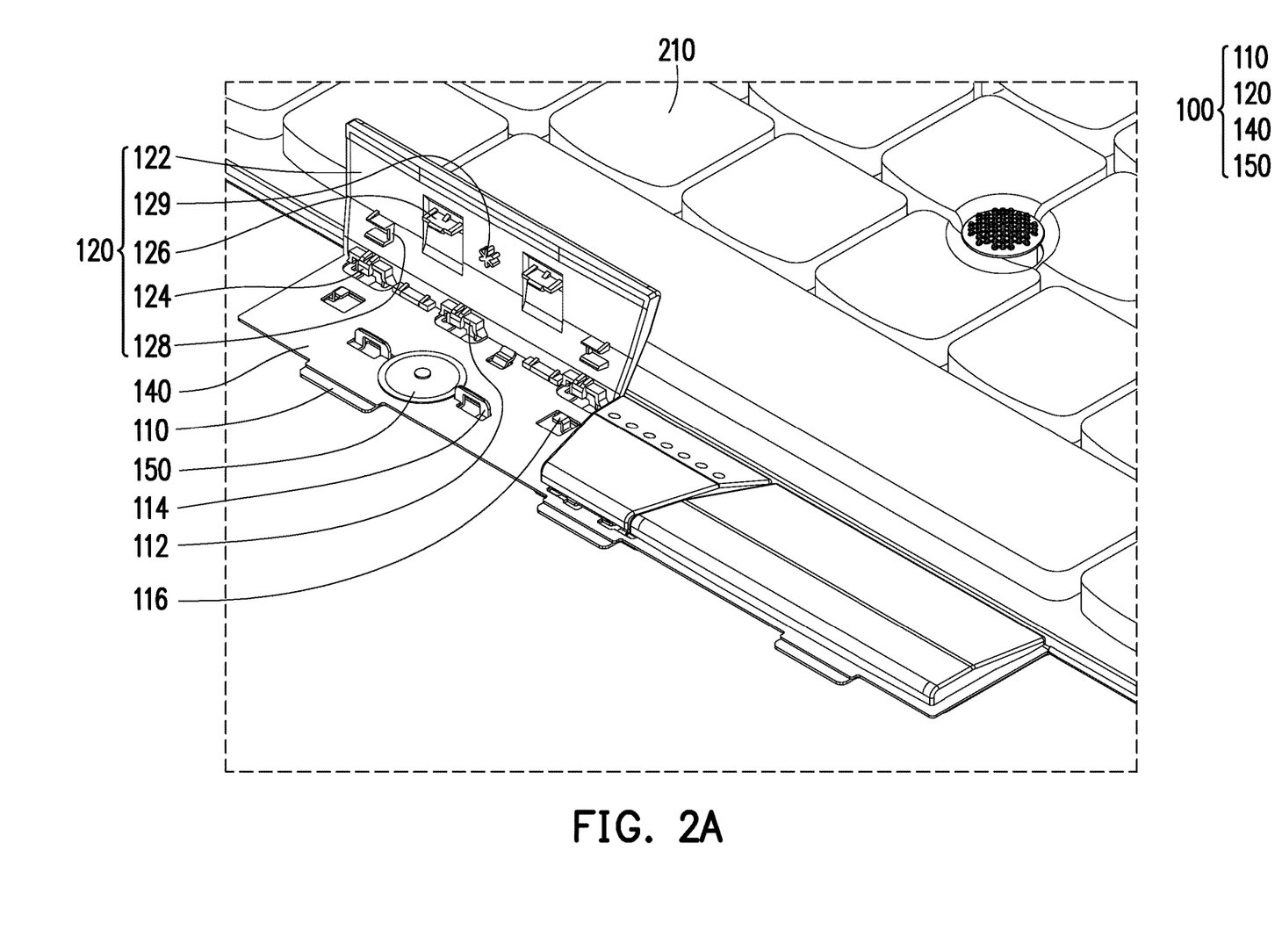
FIG. 2A is a local exploded diagram of area A of FIG. 1.
Figure 2B:
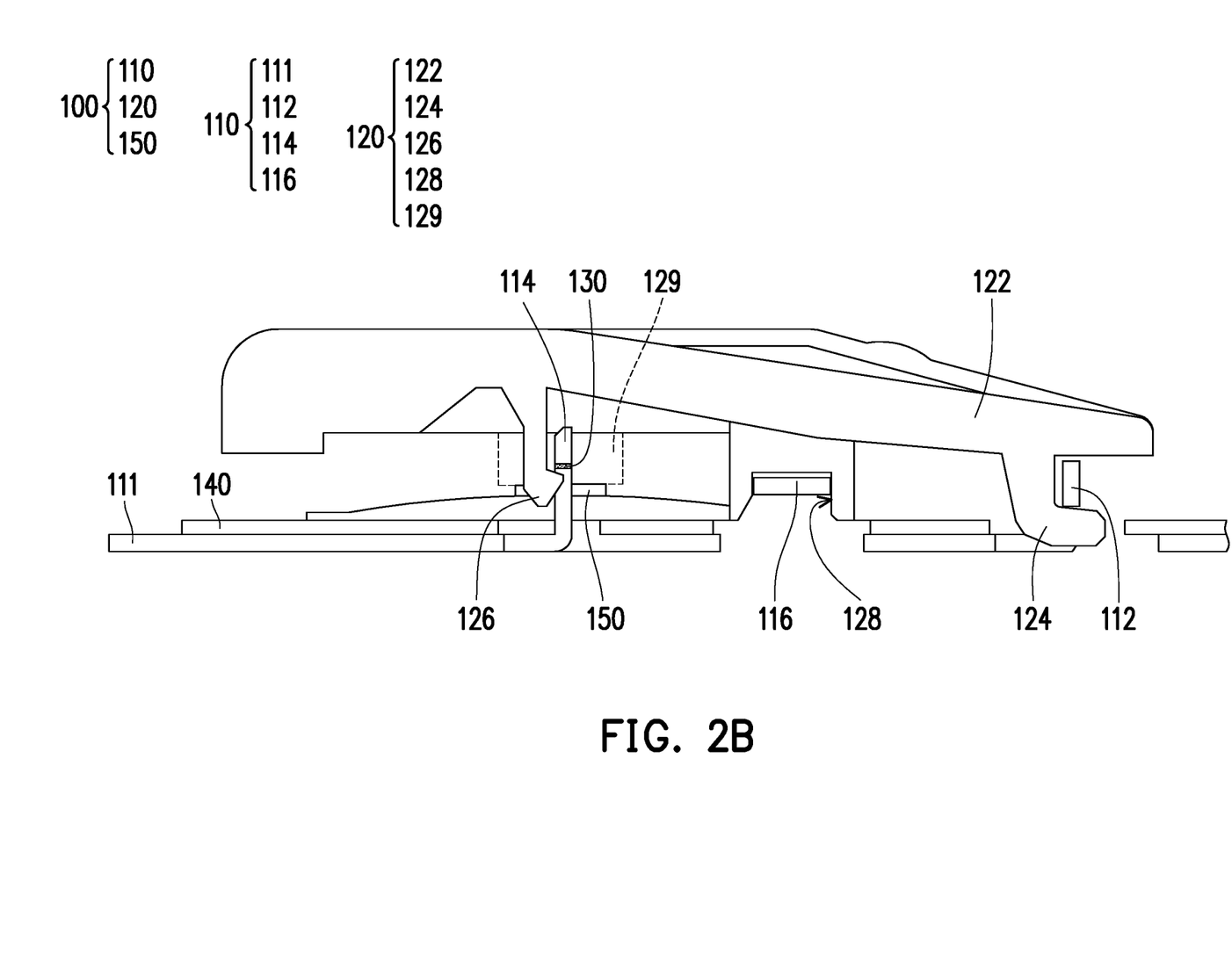
FIG. 2B is a schematic cross-sectional diagram of an input device in FIG. 2A.
Figure 2C:
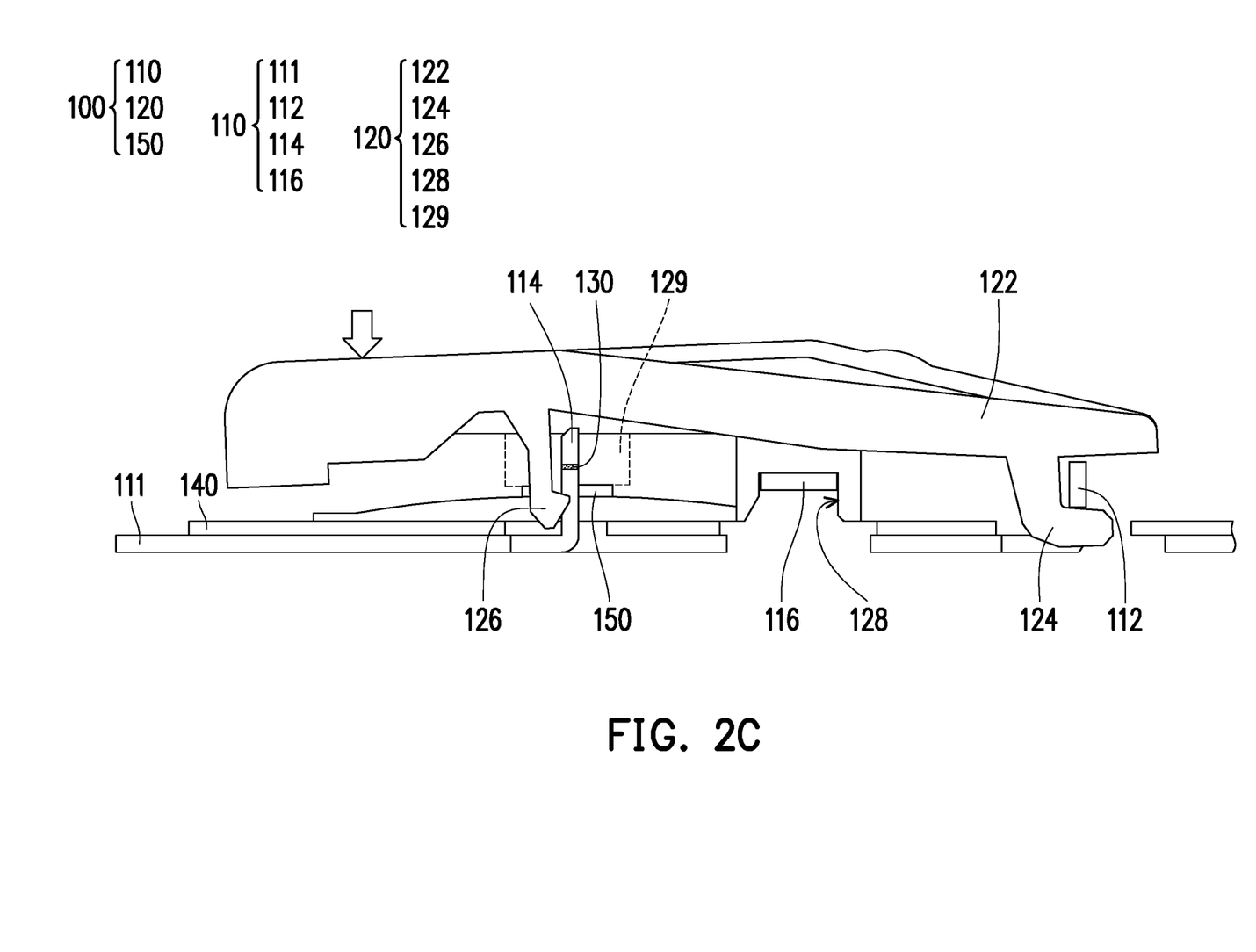
FIG. 2C is a schematic diagram of a pressed input device in FIG. 2B.

FIG. 1 is a schematic diagram of a keyboard of a notebook computer. FIG. 2A is a local exploded diagram of area A of FIG. 1, where a key in FIG. 2A is turned up relative to a substrate, to clearly show structures located on a lower surface of the key and an upper surface of the substrate. FIG. 2B is a schematic cross-sectional diagram of an input device in FIG. 2A. FIG. 2C is a schematic diagram of a pressed input device in FIG. 2B. Herein, it is noted that, to clearly show a connection relationship between the key and the substrate of the input device, it should be understood that FIG. 2B and FIG. 2C are schematic diagrams drawn based on different section planes and only illustratively show detailed structures of main features. The embodiments of the invention are not limited thereto. Referring to FIG. 1, FIG. 2A, FIG. 2B, and FIG. 2C together, an input device 100 in an embodiment is disposed on one side of a keyboard module 200 of a notebook computer, and may be electrically or mechanically integrated with the keyboard module 200 of the notebook computer; or the input device 100 and the keyboard module 200 of the notebook computer may be electrically or mechanically disposed separately as required. The input device 100 located on one side of the keyboard module 200 could serve as an operation key of a cursor stick or a touchpad. The disposition and connection design of the input device 100 will be described below in detail.

Still referring to FIG. 1, FIG. 2A, FIG. 2B, and FIG. 2C, the input device 100 includes a substrate 110, a key 120, a buffer unit 130, and a membrane switch 140. The substrate 110 includes a plate portion 111, and a connecting portion 112 and a limiting portion 114 that are separately formed on two opposite sides of the plate portion 111. The key 120 disposed on the substrate 110 includes a body 122, and a first engagement portion 124 and a second engagement portion 126 located on two opposite sides of the body 122. The first engagement portion 124 and the second engagement portion 126 are located between the body 122 and the substrate 110 and fall within a coverage range of the body 122. The orthographic projection of the body 122 projected onto the substrate 110, for example, covers or overlaps the orthographic projections of the first engagement portion 124 and the second engagement portion 126 projected onto the substrate 110. The first engagement portion 124 is in contact with the connecting portion 112, so that the key 120 may rotate relative to the substrate 110 by taking the connecting portion 112 as a rotation center. The second engagement portion 126 faces the limiting portion 114 and is spaced apart from the limiting portion 114. The buffer unit 130 is disposed on at least one of two surfaces of the limiting portion 114 and the second engagement portion 126 facing each other. The membrane switch 140 is disposed on the plate portion 111 of the substrate 110, and includes a plurality of switches, where at least one of the plurality of switches is correspondingly located between the key 120 and the substrate 110.

Specifically, the keyboard module 200 includes a plurality of key structures having, for example, a plurality of keycaps 210, the membrane switch 140 and a bottom plate 110 that are stacked from top to bottom, so that the key structures may be pressed by a user to generate a press signal to input an instruction. That the input device 100 is electrically integrated with the keyboard module 200 of the notebook computer means that the input device 100 and the keyboard module 200 share a same membrane switch 140. That the input device 100 and the keyboard module 200 of the notebook computer are electrically disposed separately means that the input device 100 and the notebook computer include their own membrane switch 140. Similarly, that the input device 100 is mechanically integrated with the keyboard module 200 of the notebook computer means that the input device 100 and the keyboard module 200 share a same substrate 110. The input device 100 and the keyboard module 200 of the notebook computer are mechanically disposed separately means that the input device 100 and the notebook computer include their own substrate 110.

In the present embodiment, the plate portion 111 may be made of a metal plate, and the connecting portion 112 and the limiting portion 114 may be integrally formed on the metal plate by processing manners such as punching and bending the metal plate. As shown in FIG. 2A, corresponding to a position below a single key 120, the upper surface of the substrate 110 includes, for example, three connecting portions 112 and two limiting portions 114 that extend and protrude toward the key 120. The connecting portions 112 are disposed relatively close to the keyboard module 200, and the limiting portions 114 are disposed relatively away from the keyboard module 200. The connecting portions 112 are arranged along a longitudinal-axis direction of the key 120 and separated from each other. Each connecting portion 112 includes a perpendicular section (not shown) and a horizontal section (not shown). The perpendicular section is connected to the plate portion 111 and extends in a direction toward the key 120, the horizontal section is connected to the perpendicular section and extends in a direction substantially perpendicular to the perpendicular section, and the perpendicular section and the horizontal section are combined to constitute a buckling structure including an opening. The limiting portions 114 are arranged along a longitudinal-axis direction of the keys 120 and are separated from each other. Similarly, each limiting portion 114 includes a perpendicular section (not shown) and a horizontal section (not shown). The perpendicular section is connected to the plate portion 111 and extends in a direction toward the key 120, the horizontal section is connected to the perpendicular section and extends in a direction substantially perpendicular to the perpendicular section, and the perpendicular section and the horizontal section are combined to constitute a confine structure including an opening. In an embodiment, an arrangement direction of the connecting portions 112 is substantially parallel to an arrangement direction of the limiting portions 114, but is not limited thereto. In addition, quantities of the connecting portions 112 and the limiting portions 114 are not limited to the foregoing embodiment, and one or more connecting portions 112 and one or more limiting portions 114 may be disposed based on actual requirements.

On the other hand, the first engagement portion 124 and the second engagement portion 126 of the key 120 respectively protrude from the bottom surface of the body 122, and the positions and quantity of the first engagement portions 124 and the second engagement portions 126 are respectively arranged corresponding to the connecting portions 112 and the limiting portions 114. Each first engagement portion 124 is pivotally connected to the corresponding connecting portion 112, and the first engagement portion 124, for example, extends through and is disposed in an opening of the connecting portion 112. In an embodiment, each first engagement portion 124 extends from the bottom surface of the body 122 toward the keyboard module 200 and includes a buckling end (not shown), a protruding structure and a chamfer may be formed at a position of the buckling end corresponding to the connecting portion 112, so that the first engagement portion 124 is easily inserted into the connecting portion 112 and combined with the connecting portion 112. Each second engagement portion 126 is movably extends through and is disposed in an opening of the corresponding limiting portion 114. Each second engagement portion 126 includes a tail end extending toward the first engagement portion 124, so that the second engagement portion 126 may match the limiting portion 114 through the tail end. In addition, the first engagement portion 124 and the second engagement portion 126 are both located within the coverage range of the body 122. Therefore, after the key 120 is assembled to the substrate 110, the first engagement portion 124 and the second engagement portion 126 are hidden below the body 122 and are not exposed.

Figure 3:
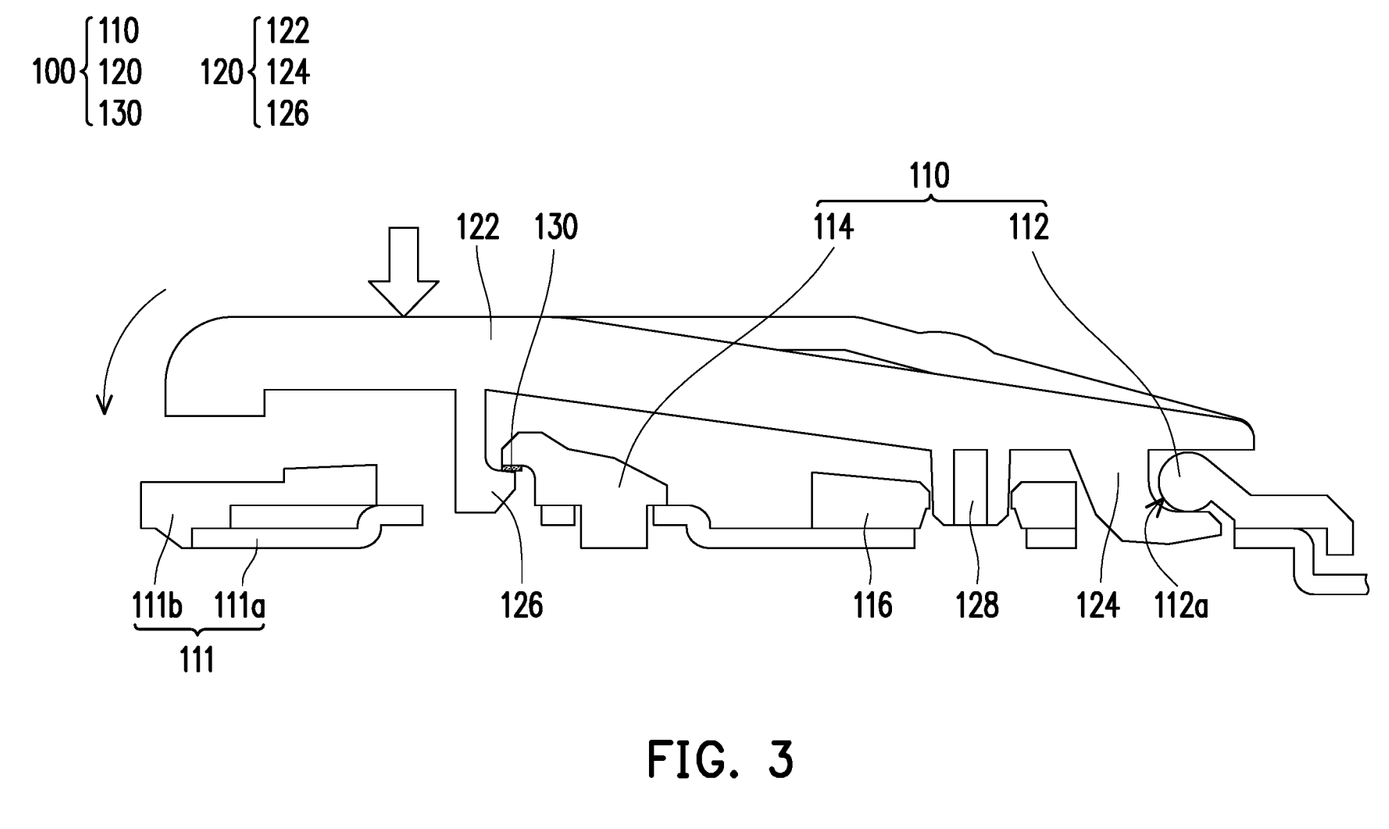
FIG. 3 is a schematic cross-sectional diagram of an input device according to another embodiment of the invention.
Figure 4:
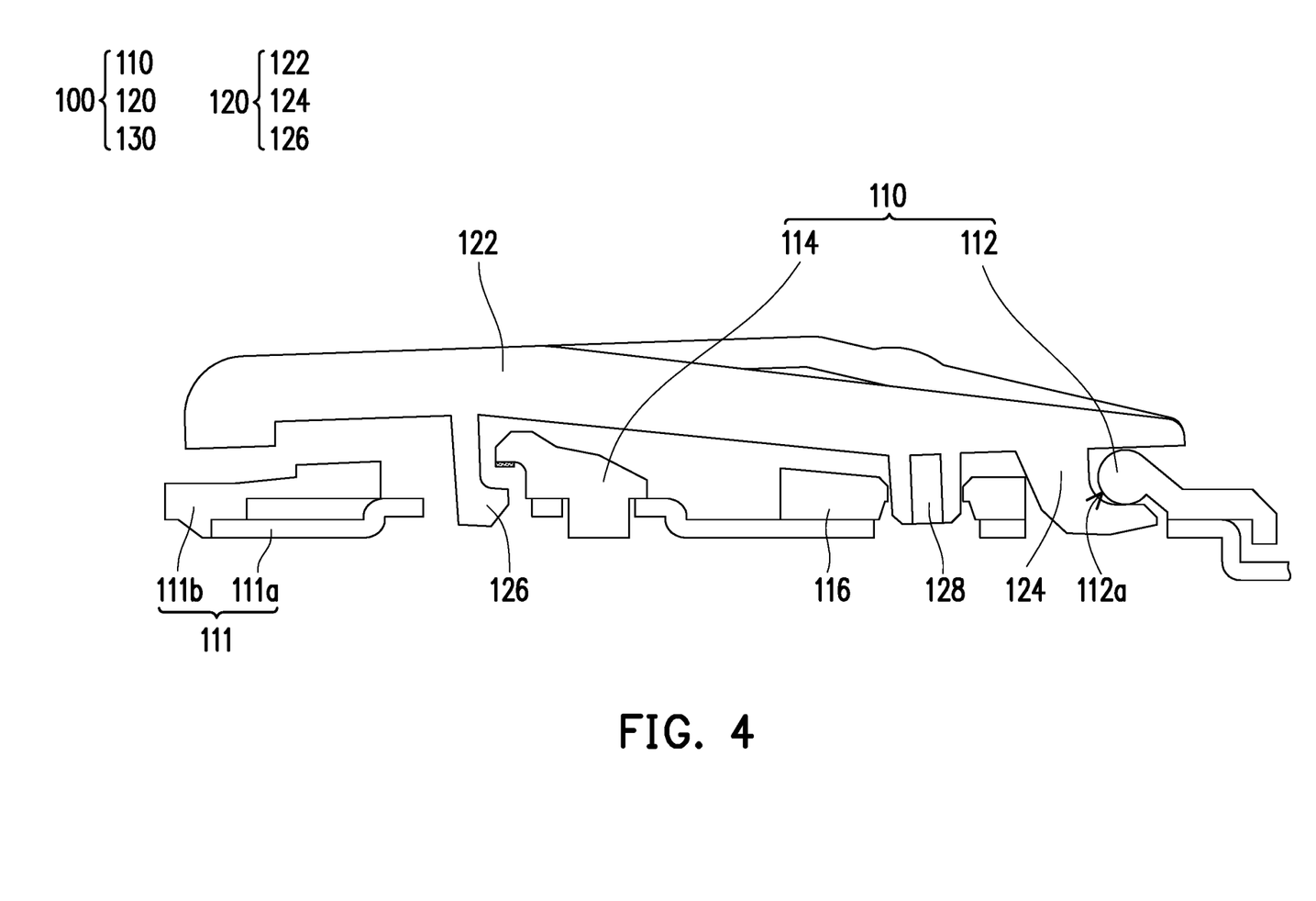
FIG. 4 is a schematic diagram of a pressed key in FIG. 3.

In the embodiment of FIG. 2B, description is made by using an example in which the plate portion 111 is made of a metal plate, but in another embodiment of FIG. 3, the plate portion 111 could be formed by a supporting plate 111a and an assembling plate 111b joining together. The supporting plate 111a, for example, is a metal plate, and the assembling plate 111b, for example, is a plastic plate. FIG. 3 is a schematic cross-sectional diagram of an input device according to another embodiment of the invention. FIG. 4 is a schematic diagram of a pressed key in FIG. 3. Similarly, to clearly show a connection relationship between the key and the substrate, FIG. 3 and FIG. 4 are schematic diagrams drawn based on different section planes, and assemblies same as or similar to those in the foregoing embodiment are indicated by using same symbols.

In detail, the assembling plate 111b may be stacked above the supporting plate 111a, and the supporting plate 111a includes a plurality of holes (not shown). The holes are configured to allow a plurality of columns (not shown) of the assembling plate 111b to pass through, and the columns (not shown) may be melted in a hot melting manner and then cooled and solidified in the holes (not shown), to fix the assembling plate 111b and the supporting plate 111a together. In another possible implementation, the supporting plate 111a and the assembling plate 111b may also be fixed together in an insert molding manner, to form a composite plate portion 111.

In addition, the connecting portion 112 and the limiting portion 114 that are located on the plate portion 111 and extend toward the key 120, for example, are connected to and protrude from the assembling plate 111b. The connecting portion 112 and the limiting portion 114 may be integrally formed when the assembling plate 111b is formed, and therefore have an advantage that shapes of the connecting portion 112 and the limiting portion 114 are easy to change.

Referring to FIG. 2B and FIG. 3 together, one of the limiting portion 114 and the second engagement portion 126 is a hook, and the other of the limiting portion 114 and the second engagement portion 126 is a hole. Specifically, in the present embodiment, the first engagement portion 124 and the second engagement portion 126 are made hook-shaped, and the connecting portion 112 and the limiting portion 114 are made into clamping holes. When the key 120 is assembled on the substrate 110, the first engagement portion 124 is in contact with the connecting portion 112, and the second engagement portion 126 corresponds to the limiting portion 114, but the second engagement portion 126 and the limiting portion 114 are spaced apart from each other at a distance or abut against each other.

In an embodiment, the hook of the first engagement portion 124 is pivotally disposed in the hole of the connecting portion 112, so that the body 122 of the key 120 may swing up and down relative to the plate portion 111 by taking the connecting portion 112 as a pivot or a rotation shaft (as shown in FIG. 2B, FIG. 2C, FIG. 3, and FIG. 4). The hook of the second engagement portion 126 is limited in boundaries of the hole of the limiting portion 114 to limit an amplitude of the up-and-down swing of the key 120, so that the key 120 may be prevented from dropping or being separated from the substrate 110. In the cross-sectional diagrams in FIG. 2B and FIG. 3, the connecting portion 112, the limiting portion 114, the first engagement portion 124, and the second engagement portion 126 are all seem like hooks, but actually, the connecting portion 112 and the limiting portion 114 form holes with a shape like a football goal structure (as shown in FIG. 2A), where the holes may be through holes, or may be blind holes. That is, the connecting portion 112 or the limiting portion 114 may be an inverted-U-shaped hole combining two perpendicular sections and one horizontal section. In another embodiment, the connecting portion 112 or the limiting portion 114 may alternatively be an L-shaped hole combining one perpendicular section and one horizontal section. In addition, the first engagement portion 124 or the second engagement portion 126 may further be made into a claw shape, and is not limited to a hook shape.

As shown in FIG. 3 and FIG. 4, the connecting portion 112 may further include a curved surface 112a, that is, a lower surface of the connecting portion 112 facing the first engagement portion 124 may be filleted (that is, to form a rounded angle), so that the first engagement portion 124 is in contact with the curved surface 112a of the connecting portion 112. In this way, when a force is applied to the key 120 or the applied force is removed to have the key 120 rotate around the connecting portion 112, the first engagement portion 124 moves and rotates along the curved surface 112a, to drive the second engagement portion 126 to relatively move close to or relatively move away from the limiting portion 114. It should be particularly noted that, a contour of the surface of the connecting portion 112 facing the first engagement portion 124 is not limited to the foregoing disclosure, and may be adjusted based on actual requirements. For example, the surface of the connecting portion 112 facing the first engagement portion 124 is chamfered, or the surface of the first engagement portion 124 facing the connecting portion 112 is filleted or chamfered.

Still referring to FIG. 2A and FIG. 2B, the input device 100 further includes a restoration member 150. The restoration member 150 is disposed on the plate portion 111 of the substrate 110, and is located between the membrane switch 140 and the key 120. The restoration member 150 may be a rubber dome or a metal dome. The single restoration member 150 corresponding to the key 120 is located on an opposite side of the connecting portion 112 on the substrate 110, that is, located on one side closer to the limiting portion 114. In the present embodiment, the restoration member 150 may be disposed on the plate portion 111 between two limiting portions 114. The restoration member 150 is configured to provide an elastic restoring force to the key 120 after the force applied to the key 120 is removed, so that the key 120 is raised to recover to an original position. Corresponding to the disposition of the restoration member 150, the key 120 further includes a trigger portion 129. The trigger portion 129 is disposed on the bottom surface of the body 122 and abuts the top of the restoration member 150. For example, the trigger portion 129 and the restoration member 150 may be disposed above the corresponding switch of the membrane switch 140. Therefore, when the key 120 is pressed, the trigger portion 129 presses against the restoration member 150 to deform the restoration member 150 and downward trigger the switch of the membrane switch 140, thereby generating a press signal.

In addition, the substrate 110 further includes a first positioning portion 116, and the key 120 further includes a second positioning portion 128, where the corresponding second positioning portion 128 and first positioning portion 116 may be detachably engaged with each other. The first positioning portion 116 extending upward from the plate portion 111 (in a direction toward the key 120), for example, is located between the connecting portion 112 and the limiting portion 114. The second positioning portion 128 extending downward from the body 122 (in a direction toward the substrate 110), for example, is located between the first engagement portion 124 and the second engagement portion 126. In an embodiment, one of the first positioning portion 116 and the second positioning portion 128 is a groove, and the other is a protruding column. In an embodiment in FIG. 2B and FIG. 2C, the first positioning portion 116 is a protruding column, and the second positioning portion 128 is a groove, where the protruding column may fit in the groove. In the embodiment of FIG. 3 and FIG. 4, the second positioning portion 128 is a protruding column, the first positioning portion 116 is a plastic structure of the assembling plate 111b on the supporting plate 111a, and the structure forms a groove that may accommodate the second positioning portion 128 (the protruding column). The first positioning portion 116 and the second positioning portion 128 may be disposed to facilitate the movement of the key 120 relative to the substrate 110, so as to prevent the key 120 from swinging left and right.

The buffer unit 130 disposed on at least one of two surfaces of the limiting portion 114 and the second engagement portion 126 facing each other may be PU, a polymeric foam, epoxy resins, an oil layer, a thermal curing layer, or a photocuring layer. In an embodiment, the buffer unit 130 may be formed on the limiting portion 114 or the second engagement portion 126 in an injection molding manner, and therefore, the buffer unit 130 may be integrally connected to the limiting portion 114 or the second engagement portion 126 to form in a single piece. The buffer unit 130 is made of a softer material than the limiting portion 114 or the second engagement portion 126. A hardness of the buffer unit 130 is less than that of the limiting portion 114 and the second engagement portion 126. That is, the buffer unit 130 may be made of a softer material and therefore can provide buffering and insulation functions between the limiting portion 114 and the second engagement portion 126, thereby alleviating the friction and collision when the limiting portion 114 is in contact with the second engagement portion 126, and greatly reducing the tapping noise or vibration when the input device 100 is actuated.

When the key 120 is not pressed, the second engagement portion 126 and the limiting portion 114 are spaced apart at a distance, and the buffer unit 130 is disposed on the surface of the limiting portion 114 facing the second engagement portion 126 (for example, the horizontal section of the limiting portion 114), where the second engagement portion 126 may be in contact with the buffer unit 130. In another embodiment, when an external force is not applied to the key 120, the second engagement portion 126 may be not in contact with the buffer unit 130. In other words, there may be a gap between the second engagement portion 126 and the buffer unit 130.

Referring to FIG. 2B and FIG. 2C or FIG. 3 and FIG. 4 together, when a user presses the key 120, the user applies a force to a side of the body 122 of the key 120 close to the second engagement portion 126. In this case, the first engagement portion 124 is buckled on the connecting portion 112, the first engagement portion 124 is in contact with the curved surface 112a of the connecting portion 112 and moves along the curved surface 112a of the connecting portion 112, and by taking the connecting portion 112 as a rotation axis, the side of the body 122 on which the second engagement portion 126 is correspondingly disposed would rotate counterclockwise, so that the second engagement portion 126 relatively moves away from the limiting portion 114. Meanwhile, the restoration member 150 is deformed under a downward press of the body 122 of the key 120, and generates an elastic restoring force.

When the force applied to the key 120 is removed, the elastic restoring force of the restoration member 150 pushes the body 122 of the key 120, so that by taking the connecting portion 112 as a rotation axis, the side of the body 122 on which the second engagement portion 126 is correspondingly disposed would rotate clockwise, and the second engagement portion 126 relatively moves close to the limiting portion 114 as the body 122 rotates. The effect of the elastic restoring force may cause the second engagement portion 126 to directly hit the limiting portion 114, and therefore, by disposing the buffer unit 130 on the surface of the limiting portion 114, the tapping noise can be significantly reduced.

Particularly, in the foregoing embodiment, description is made by using an example in which the buffer unit 130 is disposed on the surface of the limiting portion 114 facing the second engagement portion 126. However, in another embodiment of the invention, the buffer unit 130 may alternatively be disposed on the surface of the second engagement portion 126 facing the limiting portion 114 (for example, on the tail end of the second engagement portion 126). In this way, the buffer unit 130 can also provide buffering between the limiting portion 114 and the second engagement portion 126 and reduce noise or vibration generated when the key 120 is reset. In an embodiment, the buffer unit 130 may be additionally disposed between the connecting portion 112 and the first engagement portion 124, which can alleviate wear of the connecting portion 112 and the first engagement portion 124.

If the buffer unit 130 was not included in the input device, the second engagement portion 126 would directly strike the limiting portion 114 and generates the noise due to the collision. In the embodiments, the buffer unit 130 disposed on any one surface of the limiting portion 114 and the second engagement portion 126 facing each other is formed by a softer material, such as PU, a polymeric foam, epoxy resins, an oil layer, a thermal curing layer, or a photocuring layer. That is, the hardness of the buffer unit 130 is less than that of the limiting portion 114 or the second engagement portion 126. Therefore, the buffer unit 130 can absorb the energy when the second engagement portion 126 hits the limiting portion 114, thereby reducing the tapping sound.

Therefore, the input device 100 in the embodiments has the advantages of reducing the tapping sound and being quieter in use. Furthermore, when the substrate 110 is made of a metal material and the key 120 is made of a plastic material, by using the buffer unit 130, wear or fracture caused by the second engagement portion 126 hitting the limiting portion 114 can be avoided, thereby prolonging the service life of the input device 100.

It should be noted that, in the present embodiment, locations and directions, for example, up, down, left, right, clockwise, and counterclockwise, are described mainly with reference to the accompanying drawings; and when reference standards change due to overturn of the accompanying drawings, the foregoing descriptions related to the locations and directions change as the reference standards change.

Figure 5:
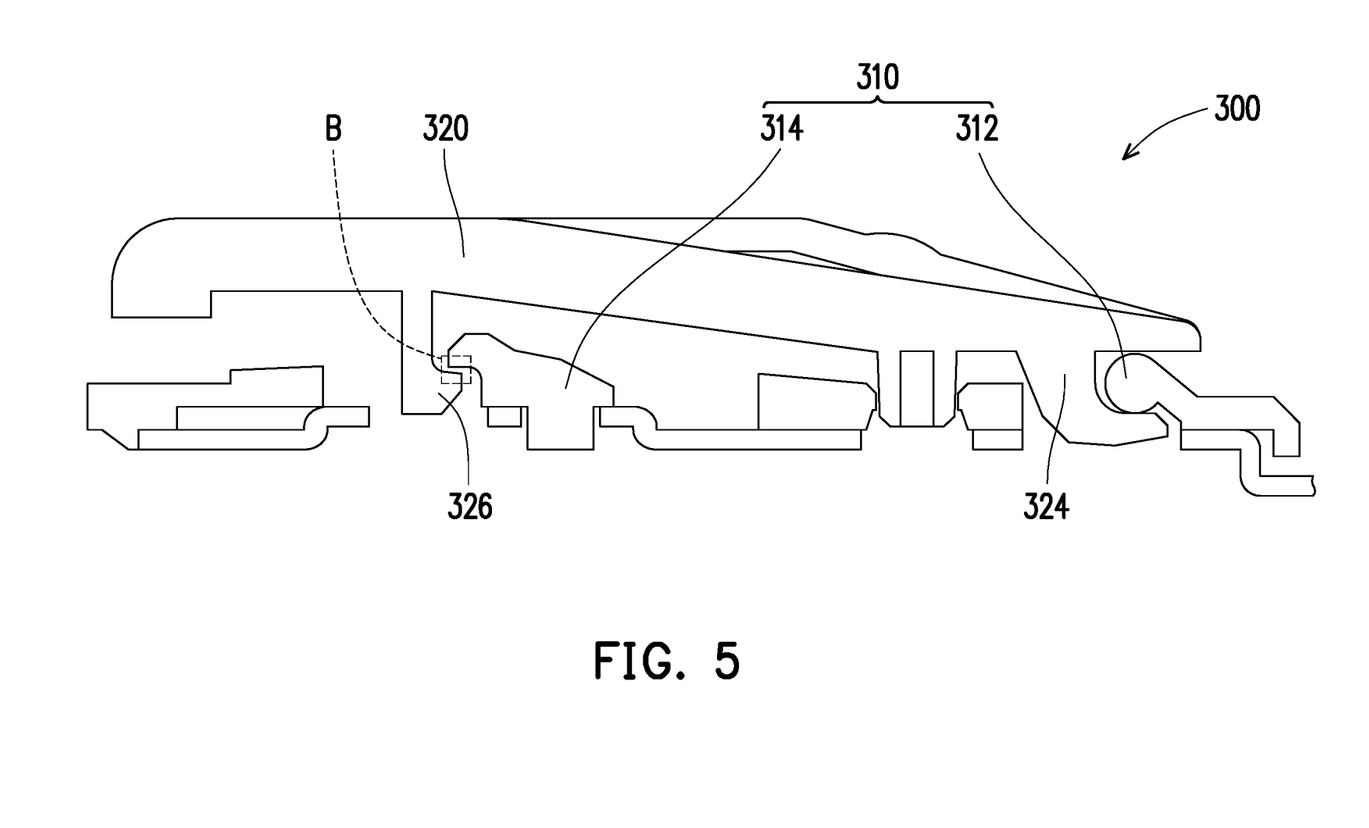
FIG. 5 is a schematic cross-sectional diagram of an input device according to another embodiment of the invention.

FIG. 5 is a schematic cross-sectional diagram of an input device according to another embodiment of the invention. Referring to FIG. 5, with a similar architecture in the foregoing embodiments, an input device 300 in the present embodiment includes a substrate 310, a key 320, a membrane switch (not shown in the figure), and a restoration member (not shown in the figure).

The substrate 310 includes a connecting portion 312 and a limiting portion 314, and the key 320 of the input device 300 includes a first engagement portion 324 and a second engagement portion 326 located on two opposite sides. The first engagement portion 324 is in contact with the connecting portion 312, and the second engagement portion 326 and the limiting portion 314 are spaced apart. Therefore, the key 320 may rotate relative to the substrate 310 by taking the connecting portion 312 as a rotation center. The membrane switch (not shown in the figure) is disposed between the substrate 310 and the key 320, and includes a plurality of switches, where at least one of the plurality of switches is correspondingly located between the key 320 and the substrate 310. The restoration member (not shown in the figure) is disposed on the substrate 310, and is configured to provide an elastic restoring force to the key 320.

In the present embodiment, the input device 300 includes a buffer region B, and a part of the second engagement portion 326 and a part of the limiting portion 314, e.g., the respective tail ends of the second engagement portion 326 and limiting portion 314, are located in the buffer region B. In the buffer region B, the hardness of one of the second engagement portion 326 and the limiting portion 314 which are located in the buffer region B is less than that of the other of the second engagement portion 326 and the limiting portion 314. Therefore, the foregoing buffer unit 130 does not need to be additionally disposed in this embodiment.

Specifically, the limiting portion 314 and the second engagement portion 326 may be both made of the same material, for example, ABS resins or polycarbonate (PC), but the components may be adjusted to make the hardness of the limiting portion 314 located in the buffer region B less than that of the second engagement portion 326. By making the limiting portion 314 and the second engagement portion 326 have different hardness, the tapping noise between the limiting portion 314 and the second engagement portion 326 when the key 320 is restored can be alleviated. Furthermore, buffer assemblies are not required in the device.

Based on the above, the input device in the embodiments of the invention could be provided with a novel disposition architecture. In addition, in the input device in the embodiments of the invention, the buffer unit is further disposed, or the limiting portion and the pairing engagement portion both located in the buffer region are made of materials that have varying hardness, so that the energy and noise generated by the engagement portion hitting on the limiting portion can be absorbed. Furthermore, wear or fracture due to the collision between the engagement portion and the limiting portion can be further prevented, and the service life of the input device is prolonged.

Finally, it should be noted that the foregoing embodiments are merely used for describing the technical solutions of the invention, but are not intended to limit the invention. Although the invention is described in detail with reference to the foregoing embodiments, a person of ordinary skill in the art should understand that, modifications may still be made to the technical solutions in the foregoing embodiments, or equivalent replacements may be made to part or all of the technical features; and these modifications or replacements will not cause the essence of corresponding technical solutions to depart from the scope of the technical solutions in the embodiments of the invention.

What is claimed is:

1. An input device, comprising:
   a substrate, comprising a plate portion, at least one connecting portion and at least one limiting portion, wherein the connecting portion and the limiting portion are separately arranged on the plate portion;
   at least one key, disposed on the substrate and comprising a body, and at least one first engagement portion and at least one second engagement portion separately arranged on the body, wherein the first engagement portion is pivotally connected to the connecting portion, and the second engagement portion is disposed facing the limiting portion; and
   a buffer unit, disposed on at least one of two facing surfaces of the limiting portion and the second engagement portion,
   wherein a portion of the first engagement portion is disposed in a hole of the connecting portion so that the body of the key is capable of swinging up and down relative to the plate portion by taking the connecting portion as a pivot or a rotation shaft.

2. The input device according to claim 1, wherein the buffer unit comprises polyurethane, a polymeric foam, epoxy resins, an oil layer, a thermal curing layer, or a photocuring layer.

3. The input device according to claim 1, wherein the buffer unit is injection-molded and integrally connected to the limiting portion or the second engagement portion, and the buffer unit is made of a softer material than the limiting portion or the second engagement portion.

4. The input device according to claim 1, wherein the substrate further comprises a first positioning portion located between the connecting portion and the limiting portion, the key further comprises a second positioning portion located between the first engagement portion and the second engagement portion, and the first positioning portion and the second positioning portion are paired with each other.

5. The input device according to claim 1, wherein a surface of the connecting portion facing the first engagement portion comprises a curved surface or a chamfer.

6. The input device according to claim 1, wherein the first engagement portion and the second engagement portion respectively protrude from a lower surface of the key.

7. An input device, adapted for being disposed on one side of a keyboard module comprising a plurality of keycaps, wherein the input device comprises:
- a substrate, comprising at least one connecting portion and at least one limiting portion, wherein the connecting portion and the limiting portion are separately disposed;
- at least one key, comprising a body and at least one first engagement portion and at least one second engagement portion located between the body and the substrate, wherein the body is located on one side of the plurality of keycaps, the first engagement portion movably arranged in the connecting portion, the second engagement portion is disposed corresponding to the limiting portion, and the first engagement portion is located within a coverage range of the body; and
- a membrane switch, disposed on the substrate and comprising a plurality of switches, wherein at least one of the plurality of switches is correspondingly located between the key and the substrate.

8. The input device according to claim 7, wherein the connecting portion and the limiting portion are made of a metal, the connecting portion comprises an opening, and the first engagement portion is disposed in the opening.

9. The input device according to claim 7, wherein the substrate is a metal plate, the connecting portion and the limiting portion are made of plastic and are connected to the metal plate, the connecting portion comprises an opening, and the first engagement portion is disposed in the opening.

10. The input device according to claim 7, wherein the first engagement portion is in contact with the connecting portion, so that the key is capable of rotating relative to the substrate around the connecting portion, and the second engagement portion and the limiting portion are spaced apart.

11. The input device according to claim 7, wherein the first engagement portion and the second engagement portion respectively protrude from a bottom surface of the body.

12. The input device according to claim 7, wherein the substrate further comprises a first positioning portion located between the connecting portion and the limiting portion, the key further comprises a second positioning portion located between the first engagement portion and the second engagement portion, and the first positioning portion and the second positioning portion are paired with each other.

13. An input device, comprising:
- a substrate, comprising at least one connecting portion and at least one limiting portion; and
- at least one key, comprising at least one first engagement portion and at least one second engagement portion separated from each other, wherein the first engagement portion is pivotally connected to the connecting portion, and the second engagement portion faces the corresponding limiting portion, wherein
- the input device comprises a buffer region, at least a part of the limiting portion and at least a part of the second engagement portion are located in the buffer region, and a hardness of the limiting portion is different from a hardness of the second engagement portion in the buffer region, and
- the first engagement portion is in contact with the connecting portion, so that the key is capable of moving relative to the substrate around the connecting portion, and the second engagement portion and the limiting portion are spaced apart when the key is pressed.

14. The input device according to claim 13, wherein the connecting portion and the limiting portion are made of a metal, the connecting portion comprises an opening, and the first engagement portion is disposed in the opening.

15. The input device according to claim 13, wherein the substrate is a metal plate, the connecting portion and the limiting portion are made of plastic and are connected to the metal plate, the connecting portion comprises an opening, and the first engagement portion is disposed in the opening.

16. The input device according to claim 13, wherein the limiting portion located in the buffer region is made of a softer material than the second engagement portion.

17. The input device according to claim 13, further comprising a restoration member disposed between the substrate and the key.

18. The input device according to claim 17, wherein the key further comprises a trigger portion, and the trigger portion protrudes from a lower surface of the key and abuts the restoration member.

19. The input device according to claim 13, wherein one of the limiting portion and the second engagement portion is a hook, and the other of the limiting portion and the second engagement portion is a hole.

20. The input device according to claim 13, wherein a surface of the connecting portion facing the first engagement portion comprises a curved surface or a chamfer.

21. The input device according to claim 7, wherein the second engagement portion with a softer material facing the limiting portion is spaced apart from the limiting portion when the key is pressed, and the first engagement portion is in contact with the connecting portion.

* * * * *